US006336080B1

(12) United States Patent
Atkinson

(10) Patent No.: US 6,336,080 B1
(45) Date of Patent: *Jan. 1, 2002

(54) THERMAL MANAGEMENT OF COMPUTERS

(75) Inventor: Lee W. Atkinson, Houston, TX (US)

(73) Assignee: Compaq Computer Corporation, Houston, TX (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/510,218

(22) Filed: Feb. 22, 2000

Related U.S. Application Data

(63) Continuation of application No. 08/584,317, filed on Jan. 16, 1996, now Pat. No. 6,029,119.

(51) Int. Cl.⁷ .............................................. G01K 15/00
(52) U.S. Cl. ...................................... 702/132; 713/300
(58) Field of Search ........................ 702/132; 713/300, 713/310, 320, 322, 323, 324, 330, 340

(56) References Cited

U.S. PATENT DOCUMENTS

| | | | | |
|---|---|---|---|---|
| 5,230,055 A | * | 7/1993 | Katz et al. .................. 395/750 |
| 5,287,292 A | * | 2/1994 | Kenny et al. ............... 364/550 |
| 5,315,228 A | * | 5/1994 | Hess et al. .................... 320/31 |
| 5,423,045 A | * | 6/1995 | Kannan et al. ............. 395/750 |
| 5,511,205 A | * | 4/1996 | Kannan et al. ............. 395/750 |
| 5,548,765 A | * | 8/1996 | Tsunoda et al. ............ 395/750 |
| 5,581,772 A | * | 12/1996 | Nanno et al. ............... 395/750 |
| 5,664,201 A | * | 9/1997 | Ikedea ................... 395/750.03 |
| 5,687,079 A | * | 11/1997 | Bauer et al ................. 364/175 |
| 5,717,313 A | * | 2/1998 | Grabon ........................ 320/35 |
| 5,719,800 A | * | 2/1998 | Mittal et al. ................ 364/707 |
| 5,721,837 A | * | 2/1998 | Kikinis et al. .............. 395/281 |
| 5,745,375 A | * | 4/1998 | Reinhardt et al. .......... 364/492 |
| 5,752,011 A | * | 5/1998 | Thomas et al. ............. 395/556 |
| 5,798,667 A | * | 8/1998 | Herbert ....................... 327/513 |
| 5,825,674 A | * | 10/1998 | Jackson ....................... 364/707 |
| 5,974,557 A | * | 10/1999 | Thomas et al. ............. 713/322 |
| 5,983,357 A | * | 11/1999 | Sun ............................. 713/324 |
| 6,029,119 A | * | 2/2000 | Atkinson .................... 702/132 |
| 6,043,630 A | * | 3/2000 | Koenck et al. ............. 320/128 |
| 6,047,380 A | * | 4/2000 | Nolan et al. ................ 713/324 |
| 6,158,012 A | * | 12/2000 | Watts, Jr. .................... 713/322 |

\* cited by examiner

*Primary Examiner*—Patrick Assouad
(74) *Attorney, Agent, or Firm*—Conley, Rose & Tayon, P.C.

(57) ABSTRACT

The invention is a method and apparatus for the thermal management of computers. The method features determining a temperature of a predetermined location in the computer, reading indirect inputs of the computer, determining desired states of cooling options based on the temperature and the indirect inputs, and placing the cooling options in their desired states. To determine the desired states of the cooling options, an index is formed based on the indirect inputs; and the index indicates to which of a plurality of tables of desired states of the cooling options to refer. Alternatively, the desired states of the cooling options are determined by adjusting the value of the temperature input based on the indirect inputs; the desired states of the cooling options also are dependent on the adjusted value of the measured temperature.

14 Claims, 8 Drawing Sheets

| Power conservation on? | Charging internal battery? | Lid shut or air restriction? | Index |
|---|---|---|---|
| no | no | no | 1 |
| no | no | yes | 2 |
| no | yes | no | 3 |
| no | yes | yes | 4 |
| yes | no | no | 5 |
| yes | no | yes | 6 |
| yes | yes | no | 7 |
| yes | yes | yes | 8 |

FIG. 3

| INPUT | OUTPUT results | | | | |
|---|---|---|---|---|---|
| Input temp | fan speed | CPU speed | disable fast charging? | peripheral inactivity time | next trip point at: |
| T≤60°C | off | full | no | 10 min. | 65°C |
| 60°C<T≤68°C | off | 50% | no | 10 min. | 68°C |
| 68°C<T≤72°C | 50% | 25% | no | 7 min. | 72°C |
| 72°C<T≤74°C | 75% | 12% | yes | 2 min. | 74°C |
| 74°C<T≤76°C | full | 12% | yes | 1 min. | 76°C |
| T>76°C | | standby | | | |

FIG. 4

| INPUT | OUTPUT results | | | | |
|---|---|---|---|---|---|
| Input temp | fan speed | CPU speed | video clock speed | peripheral inactivity time | Processor slow down during spin up |
| T≤70°C | off | full | full | 10 min. | off |
| 70°C<T≤73°C | off | full | full | 2 min. | off |
| 73°C<T≤76°C | off | full | full | 2 min. | on |
| 76°C<T≤79°C | off | 50% | 50% | 2 min. | on |
| 79°C<T≤82°C | off | 25% | 50% | 2 min. | on |
| 82°C<T≤86°C | slow | 25% | 50% | 2 min. | on |
| T>86 | fast | | | | |

FIG. 6

| INPUT | OUTPUT results | | |
|---|---|---|---|
| Input temp | fan speed | CPU speed | video clock speed |
| T≤70°C | off | full | full |
| 70°C<T≤73°C | slow | full | full |
| 73°C<T≤76°C | medium | full | full |
| 76°C<T≤80°C | fast | full | 50% |
| 80°C<T≤83°C | fast | 75% | 50% |
| 83°C<T≤87°C | fast | 50% | 50% |
| 87°C<T≤90°C | fast | 25% | 50% |

FIG. 7

THERMAL MANAGEMENT OF COMPUTERS

CROSS-REFERENCE TO RELATED TO APPLICATIONS

This application is a continuation of application Ser. No. 08/584,317, filed Jan. 16, 1996, issued as U.S. Pat. No. 6,029,119.

BACKGROUND OF THE INVENTION

This invention relates to thermal management of personal computers, and, more particularly, to thermal management of desktop and notebook computers.

Conventional thermal management of personal computers generally involves the use of a single thermistor physically attached to a "worst case" location in the computer. When the temperature passes fixed temperature trip-points, the management system initiates a fixed response such as turning on or off a fan.

The thermal profile of a computer depends on its electrical and mechanical setup. The actual location of a hot spot will change as the configuration of the computer changes. For example, a computer can run hotter in a section depending upon whether AC or battery power is used as the power source.

SUMMARY OF THE INVENTION

While multiple thermistors can be used to monitor all possible hot spots of a computer, this greatly complicates the circuitry. This invention addresses compensating for multiple, characterized configurations by polling the system for indirect causes of temperature profile changes. The thermal management system takes into account not only direct thermal readings but other indirect measures of the thermal condition of the computer, for example, whether the computer is under AC or battery power, to optimally respond to a rise in temperature inside a computer, allowing the response to be customized to the operating condition of the computer.

In general, the invention relates to a method of thermal management of a computer. The method features determining a temperature of a predetermined location in the computer, reading at least one indirect input of the computer, and determining a desired state of at least one cooling option, for example, a fan, based on the determined temperature and the indirect input.

In particular embodiments of the invention, the method includes placing cooling options in desired states. To determine the desired states of the cooling options, an index is formed based on the indirect inputs and the index indicates to which of a plurality of tables of desired states of the cooling options to refer. The tables include temperature ranges for the determined temperature, and the desired states of the cooling options in each table are dependent on the temperature ranges.

In one preferred illustrated embodiment, the step of determining the desired states of the cooling options features adjusting the value of the temperature input based on the indirect inputs; the desired states of the cooling options are dependent on the adjusted value of the temperature.

The indirect inputs include whether the computer is under AC or battery power, whether the computer is docked to a docking station, whether a display screen is closed, whether an option card is installed, whether a device is present which requires lower ambient temperature or generates disproportionate heat, whether an audio function is running, which processor is installed in the computer, a user-setable bit that can customize cooling requirements, a status of a charge of a battery, a video mode of the computer, whether a video monitor is being used, whether there has been a sudden and drastic increase in temperature, whether a hard drive or a floppy drive is being spun up or accessed, whether a battery is being charged, and whether the computer is in a power conservation mode.

The cooling options include a fan, a frequency setting of a processor, a complete or partial standby condition of the processor, a time-out of a peripheral, a frequency setting of a peripheral, and turning off the computer.

According to another aspect of the invention, an apparatus for thermal management of a computer includes a processor, a device for measuring temperature, an output from the device being communicated to the processor, at least one cooling option, an output from the processor controlling the at least one cooling option, and at least one indirect input related to a mode of the computer being communicated to the processor, the at least one indirect input affecting the output from the processor to the cooling resource.

Advantages of the thermal management system include the ability to use multiple cooling options and to adjust the order of implementing the cooling options depending upon the operating condition of the computer. For example, since the fan itself requires a significant amount of power, it can be advantageous to slow down the CPU before activating the fan while on battery power, but request full CPU power with the fan activated while under AC power. Additionally, the system accurately monitors the thermal profile of the computer enabling the advantageous implementation of cooling options even when the "worst case" location in the computer is within acceptable temperature limits.

BRIEF DESCRIPTION OF THE DRAWINGS

Other objects, features and advantages of the invention will be apparent from the following description taken together with the drawings in which:

FIG. 3 is an index table in accordance with the invention;

FIG. 4 is an output response table in accordance with the invention;

FIGS. 6 and 7 are output response tables associated with the process of FIG. 5.

DESCRIPTION OF THE PREFERRED EMBODIMENTS

Figure 1:
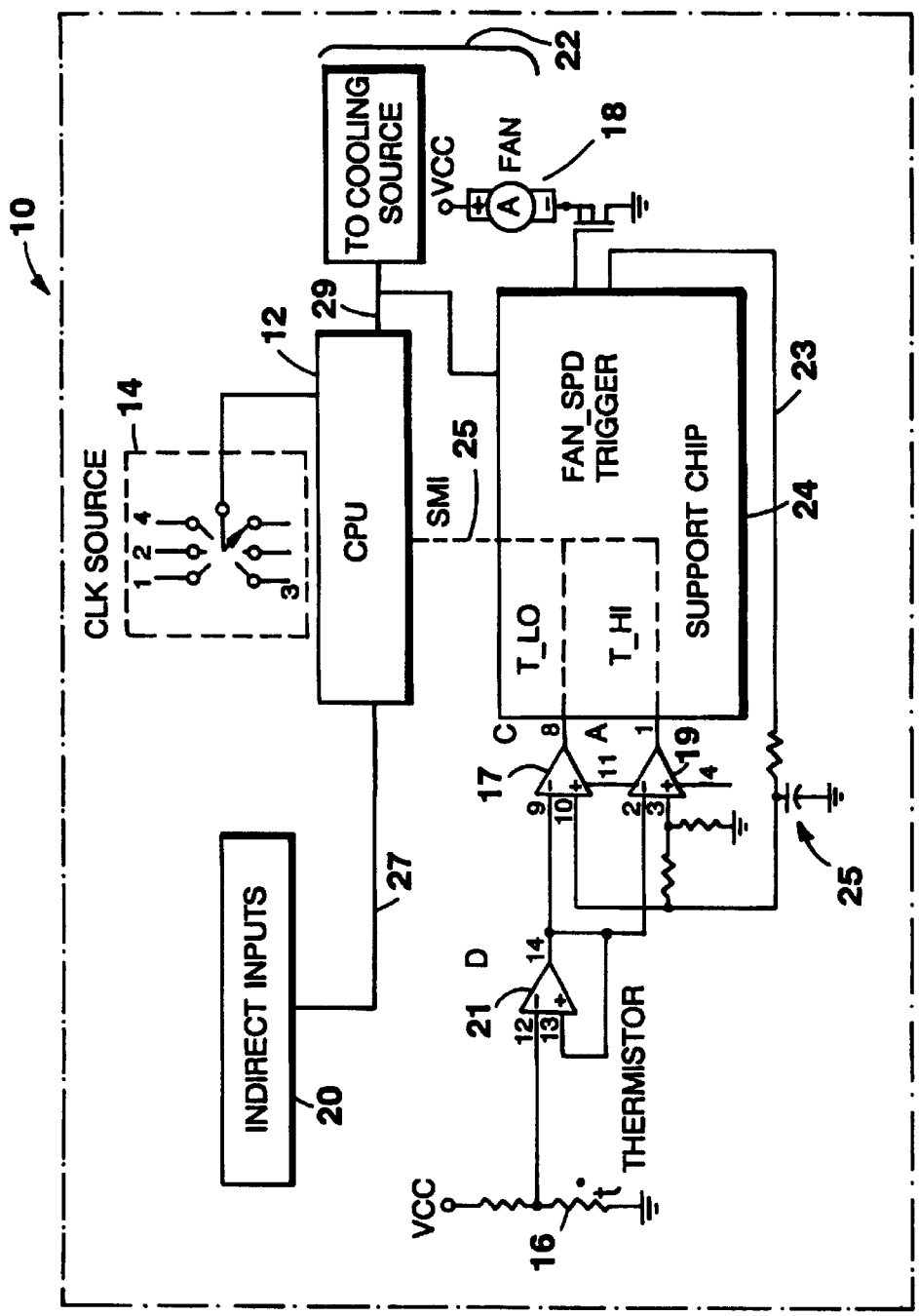
FIG. 1 is a schematic block diagram of a thermal management system.

Referring to FIG. 1, a thermal management system 10 includes a CPU 12, generally the computer processor, with a variable speed input clock 14, a thermistor 16, a variable speed fan 18 under control of CPU 12, and indirect inputs 20 readable by CPU 12. By considering the status of indirect inputs 20, computer configurations which result in the "worst case" temperature being at a location other than the location of thermistor 16 can be recognized. The status of indirect inputs 20 and the temperature reading, provided using thermistor 16, are used to coordinate the response of a number of cooling options 22 (which includes fan 18). Since operation of fan 18 compromises battery performance and noise level, it is advantageous to employ other cooling options in addition to or in place of fan 18.

Thermal management system 10 includes a peripheral chip 24, for example, an 8 bit Intel 8051 microcontroller, having an analog to digital converter to read the temperature indicated by the voltage across thermistor 16 and a variable pulse width modulated clock to set the speed of fan 18. Low and high voltage comparators 17 and 19 detect when the measured temperature drops below a predetermined low temperature or rises above a predetermined high temperature. An operational amplifier 21 is used as a buffer to prevent the comparators from affecting thermistor 16. A variable duty-width pulse trigger output 23 from chip 24 provides the reference voltage to comparators 17 and 19. The reference voltage sets the predetermined low and high temperature "trip points". Trigger output 23 at a frequency of about 100 kHz is adjustable over 256 levels of pulse width, from 0% to 100% at 0.4% increments, to adjust the reference voltage and thus the trip points. Trigger output 23 is filtered with a resistor/capacitor circuit 25 to provide a proportional DC voltage to the comparators.

The output from comparators 17 and 19 signals chip 24 when the temperature reading is outside the expected range. Chip 24 then sends an interrupt alarm to CPU 12 over a line 25. Indirect inputs 20 are read over the CPU's data and control bus 27. Cooling options are typically turned on and off through CPU I/O ports accessible from CPU 12 over lines 29. Fan 18 may be directly controlled by chip 24 either by voltage control or preferably by pulse width modulation with a frequency of about 30 to 60 Hz.

Examples of indirect inputs 20 are:
1. Whether the unit is under AC power or battery power. Under battery power the internal AC/DC power adapter is inactive and dissipates no power. Under AC power, a dual-voltage internal AC adapter may run cooler at 115 volts instead of at 230 volts.
2. Whether the unit is docked to a docking station. There may be some physical restriction by the docking base that affects the cooling of the system and therefore the thermal profile inside the unit.
3. Whether the display screen is closed. Closing the lid affects the thermal profile, for example, by restricting airflow inside the unit.
4. Whether any option cards (e.g., PCMCIA or internal modem, etc.) are installed. Option cards affect the thermal profile by impeding airflow. Option cards are generally detectable through data buses leading to the central processor.
5. Whether any device is present that requires lower ambient temperature or generates disproportionate heat. For example, a very large hard drive should be kept cooler than a small one, an optional processor may become unreliable at the otherwise standard operating temperature, and a specific type of PCMCIA card can dissipate more power than normal.
6. Whether the application is performing an audio function whereby fan noise would be annoying.
7. Which processor is installed in the computer.
8. The state of a user-setable bit that can customize cooling requirements. For example, the user may have the option of delaying fan turn-on after slowing down the processor frequency.
9. The state of the battery charge may be considered, so that cooling options that do not require power can be implemented first when battery charge is low.
10. The video mode and whether a video monitor is attached. For example, higher resolution, higher performance video modes generally cause the video controller chip to generate more heat.
11. Whether there has been a sudden and drastic increase in temperature.
12. Whether the hard drive or floppy drive is being "spun up" or accessed. The system may throttle the processor clock reducing the impulse power an internal power supply must provide thus reducing the overall internal heat dissipation.
13. Whether the system is charging a battery. Fast-charging may cause disproportionate heating in the power-supply area of the system.
14. Whether the system is in power conservation mode in which case the condition of certain thermal cooling options, such as peripheral time outs, may already be effected.

Examples of options 22 for thermal cooling include:
1. Fan 18 may be turned on and its speed changed.
2. The frequency of CPU 12 may be lowered so that it uses less power.
3. CPU 12 may be put into a complete or partial standby condition. Complete standby occurs when CPU 12 and all its peripherals are inactive, and partial standby occurs when the peripherals are inactive while CPU 12 is kept active (for example, turning off the hard drive).
4. Any peripheral which relies on timed inactivity for partial standby may have its time-out modified.
5. The system may be completely turned off.
6. CPU 12 may direct any peripheral to operate at a lower frequency so that it uses less power, for example, the frequency of the graphics controller or the system bus may be reduced.
7. A function, for example, fast charging of a battery, may be turned off.

Figure 2:
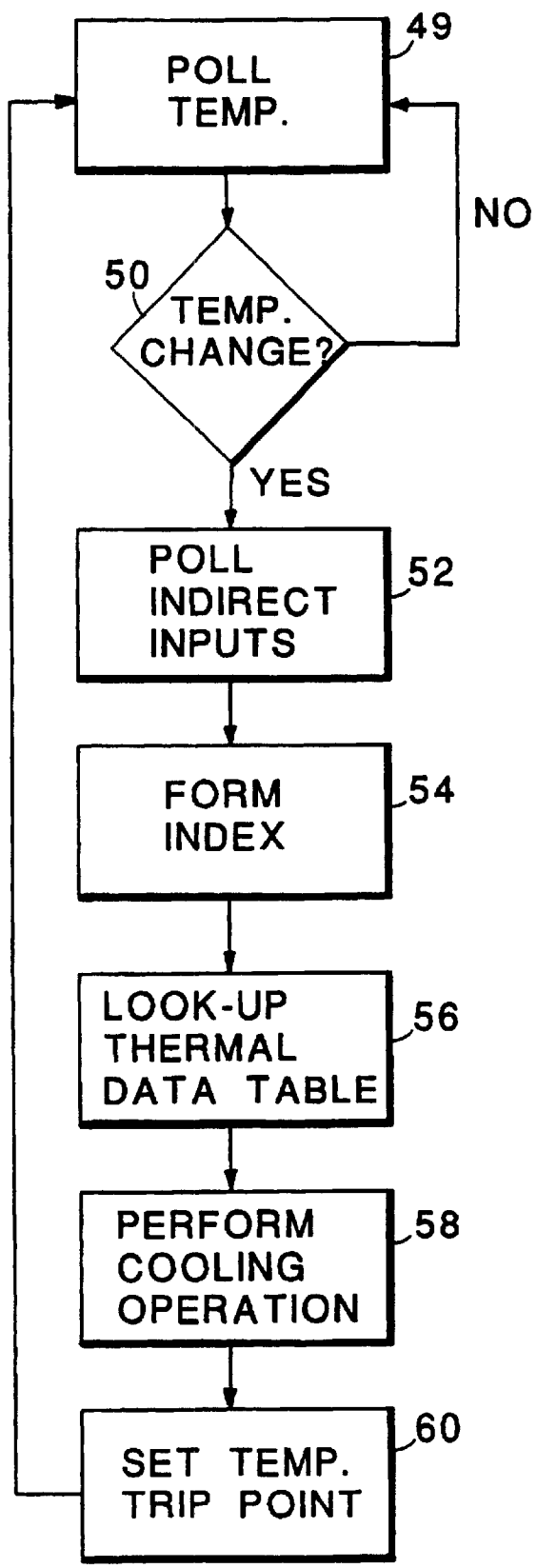
FIG. 2 is a flow chart of a thermal management process.

A particular implementation of the thermal management system uses look-up tables (such as those illustrated in FIG. 4) to determine a desired response. The temperature determined by monitoring thermistor 16 and the status of each input 20 affect the choice and desired state of cooling options 22. In operation, referring to FIG. 2, in a first embodiment of the invention, thermistor 16 is periodically polled at 49 to determine its temperature (alternatively a thermostat may send an alarm to indicate a temperature change). If the temperature changes, at 50, a number N of indirect inputs 20 are polled at 52 (N=3 in the following example) and an index is formed at 54 (as described below). An output response table corresponding to the formed index is referred to at 56 to determine the desired state of cooling options 22. The cooling options are then placed in these desired states at 58.

To cover all possible combinations of inputs N, there are $2^N$ output response tables. As shown in FIG. 4, the desired state of each cooling option in an output response table 99 is dependent upon the temperature reading from the thermistor. The response tables also give the next high temperature "trip point" at 60 for signaling a temperature change at 50 (the low temperature trip point tracks the high temperature trip point and is 5° C. less than the high temperature trip point). The input temperature ranges and next trip points in each output response table can be different.

Referring to FIGS. 3 and 4, an example of an implementation of the thermal management system utilizing three indirect inputs 32, 34 and 36 is shown. In the example, the following readings and actions are assumed to take place (referring to the steps in FIG. 2).

EXAMPLE

Step 49. Read present temperature. 70° C. (a temperature change at 50)

Step 52. Read indirect inputs 30, 32 and 34.
  i. Is the power conservation enabled? NO
  ii. Is a battery being charged? YES
  iii. Is the CPU lid shut or is there another air restriction that would change cooling profile? YES Step 54. Form an index 38. 4 (index corresponding to input states 39)

Step 56. Look-up the output response table corresponding to the index value (FIG. 4).

Step 58. Use the present temperature of 70° C. to locate the desired cooling operation 40 in the output response table.

Step 60. Use the present temperature to locate the next temperature trip points 42. 72° C. (high temperature trip point) 67° C. (low temperature trip point)

If the temperature goes above the new high temperature trip point of 72° C. and the status of inputs 20 does not change, the output response table in FIG. 4 is again referred to. The fan speed is set at 75%, the CPU is set to 12% of full speed, battery fast charging is disabled, and peripheral inactivity time before turning off is reduced to 2 minutes.

If the temperature goes below the new low temperature trip point of 67° C. and the status of inputs 20 does not change, the output response table in FIG. 4 is again referred to. The fan is turned off, the CPU is set to 50% of full speed, battery fast charging is enabled, and peripheral inactivity time before turning off is set to 10 minutes.

In use, there is one index table 97 (FIG. 3), stored in the CPU's (RAM or disk) memory, which includes entries for all N indirect inputs 20, and $2^N$ output response tables 99 (FIG. 4) in the CPU's (RAM or disk) memory. Depending on the status of inputs 20, index table 97 points to a particular output response table. Each output response table 99 is formulated to provide optimal cooling for a measured temperature and for the conditions of the indirect inputs 20.

The parameters (output results) in the output response tables 99 are determined experimentally and/or empirically. Since the conditions of indirect inputs 20 affect the thermal profile of the computer, a thermistor located at a "worst case" position may give a reading within acceptable limits while components in other areas of the computer are operating at temperatures outside their acceptable limits. For example, with the thermistor located at CPU 12, if the computer lid is shut and an internal battery is fast charging, the hottest location in the computer is likely to be at the power supply.

Since the actual "worst case" location may not be the location of the thermistor, the actual "worst case" location is determined experimentally. While recording temperatures at the locations of heat sensitive components, the states of indirect inputs 20 are manipulated and the temperature as read from thermistor 16 is noted. Under each condition of indirect inputs 20, the optimal cooling parameters of cooling options 22 are determined based on the temperature measurements. For example, with the computer lid closed and a battery fast charging, the thermistor reading may be within its acceptable limit but the temperature of the power supply is beyond its acceptable limit. Depending upon the actual reading of the thermistor, the optimal cooling parameters for this condition are to turn the fan full on and stop the battery charging. During use, given the status of indirect inputs 20 and the reading of thermistor 16, the thermal profile of the computer is effectively known and optimal cooling may be implemented.

Figure 5A:
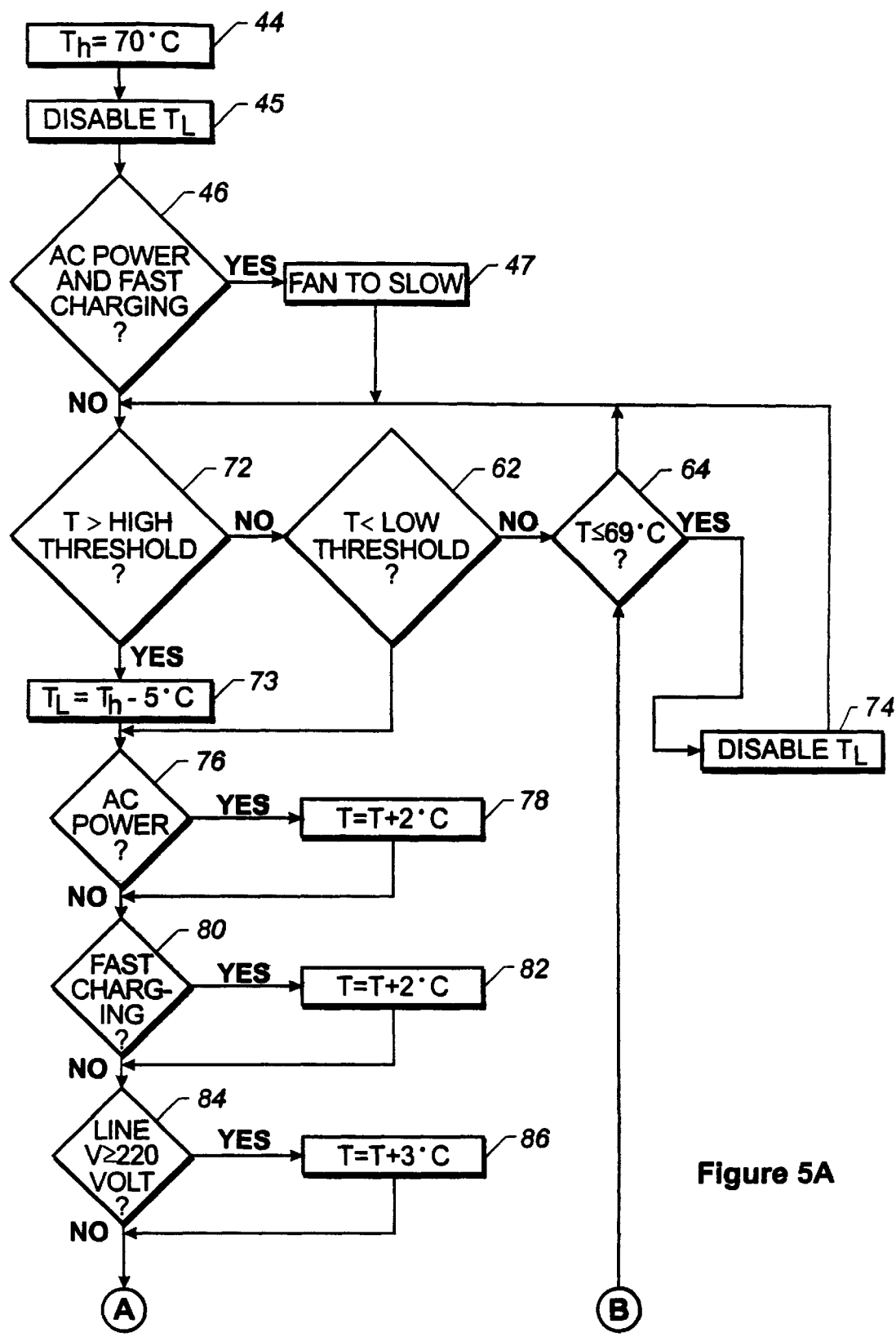
FIG. 5 is a flow chart of an alternative thermal management process.
Figure 5B:
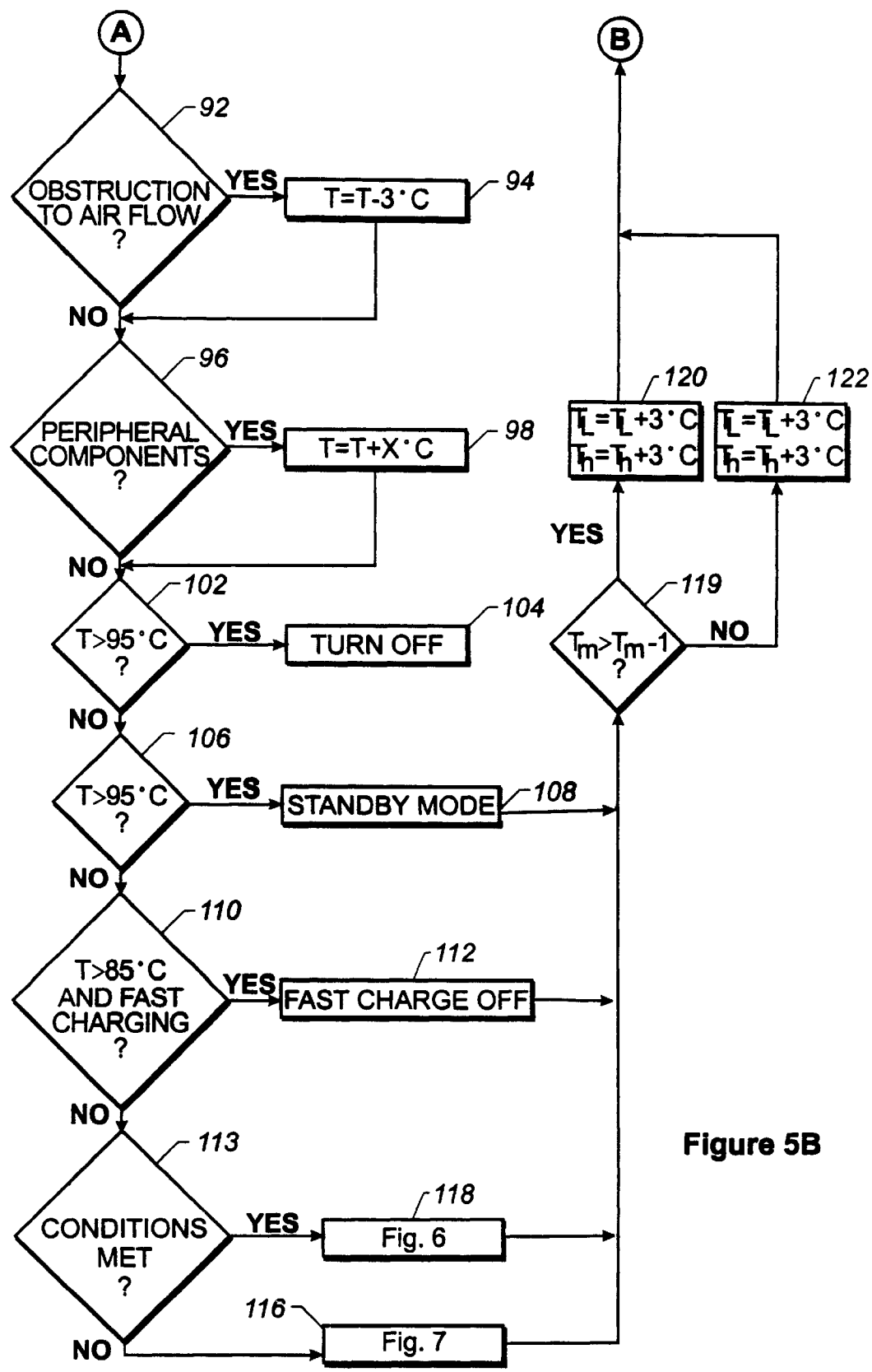

Referring now to FIG. 5, in another embodiment of the invention, the thermal management system determines the desired states of the cooling options by modifying the measured temperature according to the status of each indirect input 20. Unlike the process described above, each indirect input 20 is treated independently.

Initially, at power-on of the computer, a high temperature threshold $T_h$ is set to, for example, 70° C. at 44 and a low temperature threshold $T_L$ is disabled at 45. If the system is under AC power and is fast-charging a battery at 46, fan 18 is set to slow speed at 47. Loop 70 is then entered. If the measured temperature T is 69° C. or less at 64, all of the cooling options are turned off and the low temperature threshold is disabled at 74. The routine remains in loop 70 until the measured temperature T exceeds the high threshold. If the measured temperature T exceeds the high threshold at 72, the low-temperature boundary threshold is enabled at 5° C. under the high threshold at 73 and the measured temperature is adjusted to become a working temperature by reading indirect inputs 20. The process continues as follows:

Check at 76 if the computer is under AC power (with internal AC to DC converter). If so, add 2° C. to measured temperature to form a new working temperature at 78.

Check at 80 if the computer is fast-charging a battery. If so, add another 2° C. to the working temperature at 82.

Check at 84 if the computer is under AC power and the line voltage is 220 volts or higher. If so, add 3° C. to working temperature at 86.

Check at 92 if there are any obstructions to normal airflow (lid closed, unit docked, or PCMCIA cards in the slots)? If so, subtract 3° C. from the working temperature at 94.

Check at 96 if there are any peripherals or components that require especially low temperature for reliable operation? If so, add "x" degrees to the working temperature at 98 (depending on the sensitivity of the component).

The cooling options are implemented as follows:

1. If the working temperature is higher than 95° C. at 102, turn the unit off at 104.
2. If the working temperature is higher than 90° C. at 106, put the unit into the full "standby" mode at 108.
3. If the working temperature is higher than 85° C. and a battery is "fast charging" at 110, turn off the fast charge to the battery at 112.
4. If the working temperature is less than 90° C. and the battery is not fast charging, the table illustrated at FIG. 6 is used at 114 to determine the state of the cooling options if any one of the following conditions are met at 113 1) the computer is in power conservation mode, 2) the battery voltage is very low, or 3) an audio application is running. Otherwise the table in FIG. 7 is used at 116. The temperature input in FIGS. 6 and 7 is the working temperature determined according to FIG. 5.

New thermal high and low thresholds are then set at 120 as follows:

1. If the measured temperature is greater than the previous measured temperature at 119, i.e., if the routine exits loop 70 by function 72, add 3° C. to the "high" temperature threshold.
2. If the measured temperature is less than the previous measured temperature at 119, i.e., if the routine exits loop 70 by function 62, add 3° C. to the "low" temperature threshold.

After the temperature thresholds are adjusted, loop 70 is reentered. If the measured temperature goes above the high temperature threshold at 72, the routine implements further cooling options. If the measured temperature goes below the low temperature threshold at 62, the routine deactivates the cooling options in the reverse order.

The selection and use of the cooling options in FIG. 6 depend upon the power needed and the noise created by each cooling option. For example, as fan use consumes extra power and creates noise, it is activated only under the conditions of a working temperature above 82° C. The selection and use of the cooling options identified in FIG. 7 depend upon the effectiveness of the cooling options and the effect of the cooling option on the operating parameters of the computer. For example, as fan use is highly effective and does not affect the operating parameters of the computer, it is implemented as a first defense against a rising working temperature.

It is noted that an obstruction to normal airflow results in a lowering of working temperature 94. This occurs because the thermistor 16, under conditions of convective cooling reflects a temperature which is lower than the actual temperature of the worst case chip location but, under conditions that limit air flow, the thermistor reading is closer to the actual chip temperature.

Additions, subtractions and other modifications of the illustrated embodiments of the invention will be apparent to those practiced in the art and are within the scope of the following claims.

What is claimed is:

1. A computer system comprising:
   a temperature-control logic;
   an input to said temperature-control logic which dynamically reflects a state of a device of said computer system, wherein the state of the device affects the temperature in said computer system, and wherein said state does not reflect the device's temperature; and
   wherein said temperature-control logic controls temperature within said computer system in at least partial response to said input.

2. The computer of claim 1, further comprising a plurality of additional inputs which dynamically reflect the state of respective additional devices.

3. The computer of claim 1, wherein said input reflects whether said computer system is docked in a docking station.

4. The computer of claim 1, wherein said input reflects whether said display screen is closed.

5. The computer of claim 1, wherein said input reflects whether a PCMCIA card is installed in a slot.

6. A temperature-control module that controls a plurality of heat generating devices in a portable computer, comprising:
   circuitry which computes a temperature-control response based at least in part on an input which indicates a state of a first device of the portable computer that affects the temperature of the portable computer; and
   wherein said state does not reflect the first device's temperature.

7. The temperature-control module of claim 6, further comprising a plurality of additional inputs which reflect the state of respective additional devices.

8. The temperature control module of claim 6, wherein said input reflects whether said computer system is docked in a docking station.

9. The temperature-control module of claim 6, wherein said input reflects whether said display screen is closed.

10. The temperature-control module of claim 6, wherein said input reflects whether a PCMCIA card is installed in a slot.

11. The method of operating a computer, comprising:
    operating a first device which affects the temperature of said computer but which is not a fan, at least partially in response to a first input which indicates a temperature which is greater than optimal; and
    dynamically changing a trip-point for an optimal temperature in response to a second input which indicates activity of a second device.

12. The method of claim 11, wherein said first device is a battery whose fast charging can be turned on and off.

13. The method of claim 11, wherein said first device is a central processing unit whose frequency can be raised or lowered.

14. The method of claim 11, wherein said first device is a peripheral whose time-out can be modified.

* * * * *